(12) United States Patent
Doppstadt

(10) Patent No.: US 6,364,029 B1
(45) Date of Patent: Apr. 2, 2002

(54) MACHINE FOR DISPLACING GRINDSTONES

(76) Inventor: Werner Doppstadt, Vossnacker Str. 67, Velbert (DE)

(*) Notice: Subject to any disclaimer, the term of this patent is extended or adjusted under 35 U.S.C. 154(b) by 0 days.

(21) Appl. No.: 09/601,496
(22) PCT Filed: Feb. 4, 1999
(86) PCT No.: PCT/EP98/00580
§ 371 Date: Aug. 1, 2000
§ 102(e) Date: Aug. 1, 2000
(87) PCT Pub. No.: WO99/40263
PCT Pub. Date: Aug. 12, 1999

(51) Int. Cl.$^7$ .............. E02F 3/20; E02F 7/02; E02F 5/12; E02F 5/22
(52) U.S. Cl. ............ 172/58; 172/108
(58) Field of Search .............. 172/48, 58, 108; 37/92, 93, 189, 190, 337

(56) References Cited

U.S. PATENT DOCUMENTS

| 1,696,216 A | 12/1928 | Stanhope | |
| 2,032,911 A | 3/1936 | Brown | |
| 3,043,035 A | 7/1962 | Fogelberg | |
| 4,109,336 A | 8/1978 | Ford | 15/3 |
| 4,258,486 A | 3/1981 | Barre | 37/190 |

FOREIGN PATENT DOCUMENTS

EP 0 080 802 6/1983

Primary Examiner—Christopher J. Novosad
(74) Attorney, Agent, or Firm—Collard & Roe, P.C.

(57) ABSTRACT

The invention relates to a machine for displacing grindstones with a milling cutter (28, 30). The inventive machine is laterally guided along a grindstone, in a displacement direction, and removes a layer of material from the grindstone through milling every time it passes the grindstone. The material removed by milling drops upon a conveying device (88) used to deposit the material in an area offset from the milled grindstone. The milling cutter has two side rotating milling heads whose rotation axis extends substantially in the displacement direction or forms an acute angle relative to the displacement direction.

24 Claims, 9 Drawing Sheets

MACHINE FOR DISPLACING GRINDSTONES

TECHNICAL FIELD

The invention relates to machine for dislocating stacks by means of a milling cutter, which is laterally guided along a stack in a driving direction and through which a layer of material is removable from the stack through milling during each passage, the machine having a conveying device, onto which the material removed by milling drops and which is used to deposit the material in an area offset from the milled stack.

The invention particularly relates to the dislocating of stacks out of biological waste as, for example, branches, shrubs or biological waste.

BACKGROUND ART

Biological waste is put on stacks to finally, be decomposed to humus. These are stacks of a height and a width of several meters and often a length of hundreds of meters. The material able to be decomposed has to be dislocated from time to time in order to supply air oxygen to the stack and, thus, to support the decomposing process. If the stack is not dislocated, then the decomposing process is delayed. Furthermore, anaerobic zones arise, in which decomposing takes place under strong smell irritation.

After several dislocations in time intervals, which depend on the type of material, the material in the stacks are, to a large degree, decomposed to humus. Then, the material is supplied to a sieve machine. This sieve machine separates components which have not been decomposed. Furthermore, foils and pieces of plastic are separated. The components which have not been decomposed are supplied to the new stacks. The sieved, decomposed earth can be filled into sacks and be sold.

Several machines are known, through which this dislocation of stacks is to be done by machines.

With a prior art type of machines, a stack with a width of, for example, five meters is taken up from the front side. For this purpose, a vehicle is provided, the wheels of which run on the side of the stack and which takes up the material at the front and transports it over the vehicle, such that the material is put dawn behind the vehicle. Such a vehicle is very complicated. Free areas have to be provided on both sides of the stack. The vehicle is a single-purpose vehicle, which cannot be used for other purposes.

With another type of machines, a drum rotating about a vertical axis of rotation is guided along the stack. Then, cutting tools on the circumference of the drum remove layers from the stack. The removed material falls on a conveying device and is put down again as new stack in an area offset from the original stack. Such devices removes just a relatively thin layer from the stack through milling. If the roller is pushed to far toward the stack, then the repulsion force will be high. The machine is pushed back again. A further disadvantage of these known machines is that plastic foils often being present in the moved material are comminuted by the milling drum to such an extent that they cannot be separated anymore from the earth produced by decomposing.

The working life of the known machines is quite restricted.

In practice, the prior art machines did not work satisfactorily.

DISCLOSURE OF INVENTION

It is the object of the invention to construct a machine for dislocating stacks such that they allow a high throughput (dislocated material per unit of time), do not require any additional space between the stacks and enable long working time.

According to the invention this object is achieved in that the milling cutter has two lateral rotating milling heads, the rotation axes of which extend substantially in the driving direction or form an acute angle relative to the driving direction.

The machine is moved with the milling heads along the stack usually by means of a carrier vehicle. The milling heads cut into the material of the stack substantially in the driving direction. The resistance acting upon the milling heads acts against the driving direction and, thus, not transverse to the driving direction. During each passage, the two milling heads can remove by milling from the stack a wide strip corresponding at least to the radius of the milling head. The milling can also be effected transversely to the feed direction of the stacks. The milling heads can be very robust and are strained in longitudinal direction of their axes. This ensures long working life.

In an advantageous embodiment of the invention the milling heads are disc- or plate-shaped. Each one of the milling heads can form a plate vaulted in the driving direction and provided with milling bodies at its front side. Suitably, the milling heads are truncated cone-shaped. The milling heads are arranged one above the other. A plane extending through the rotation axes of the milling heads is inclined towards the stack by an angle which prevents the stack from collapsing in the milling plane. On a portion remote from the stack, the milling heads are covered by a cap which guides the material removed by milling to the conveying device. The milling heads rotate in the same direction. The described construction allows the milling heads to rotate with a rotary speed of more than 100 rpm.

Preferably, means for supplying water to the material transported on the conveying device are provided.

The machine is arranged to be driven by the power take-off shaft of a carrier vehicle. Thus, the drawing vehicle can be used for other purposes.

An embodiment of the invention will now be described in greater detail with reference to the accompanying drawings.

PREFERRED EMBODIMENT OF THE INVENTION

Figure 1:
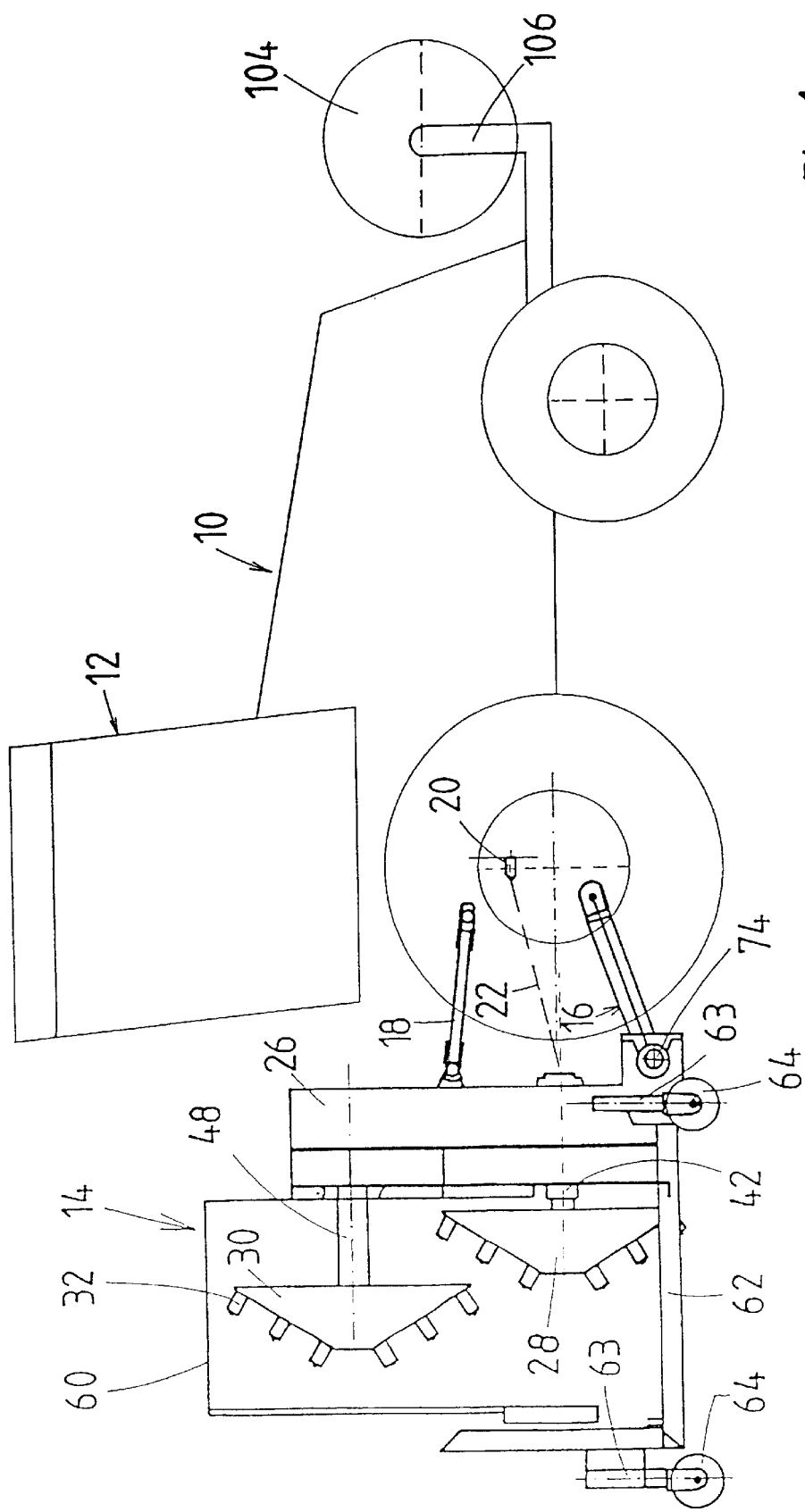
FIG. 1 is a schematic side elevation of a machine for dislocating stacks, the machine being attached to a carrier vehicle.

In FIG. 1 numeral 10 designates a carrier vehicle. The carrier vehicle is a heavy tractor having a driver's cab rotatable about 180°. In operation for dislocating a stack the carrier vehicle drives to the left in FIG. 1. The carrier vehicle 10 carries a machine for dislocating stacks and generally designated by 14. The machine 14 is supported on the carrier vehicle 10 by means of a common three-point suspension 16 and a shock absorber 18. The machine 14 is driven by the carrier vehicle 10 through a power take-off shaft 20 and a transmission 26. The transmission 26 drives two milling heads 28 and 30 arranged one above the other.

The milling heads are disc- or plate-shaped having basically truncated cone-shape and are vaulted to the front in driving direction. On the vaulted front side remote from the carrier vehicle 10 the milling heads carry cutting bodies 32. The milling heads 28 and 30 are rotatable about horizontal axes 34 and 36 extending parallel to the driving direction. The milling heads 28 and 30 are driven through the transmission 26 in the same direction with high rotary speed of more than 100 rpm. As can be seen from FIG. 2, the transmission 26 comprises a first chain drive having a chain wheel located on the input shaft 24 and a chain wheel 40 located on the shaft 42 of the lower milling head 28 and having larger diameter, as well as an endless chain. Thus, the lower milling head 28 is geared down and driven by the input shaft 24 and, thus, by the power take-off shaft 20 of the carrier vehicle 10. The shaft 42 of the lower milling head 28 is coupled to the shaft 48 through a chain drive 50. A further chain wheel 52 is located on the shaft 42 of the lower milling head 28. Through a chain 56 the chain wheel 52 is connected to a chain wheel 54 which is located on the shaft 48 of the upper milling head 30.

Figure 2:
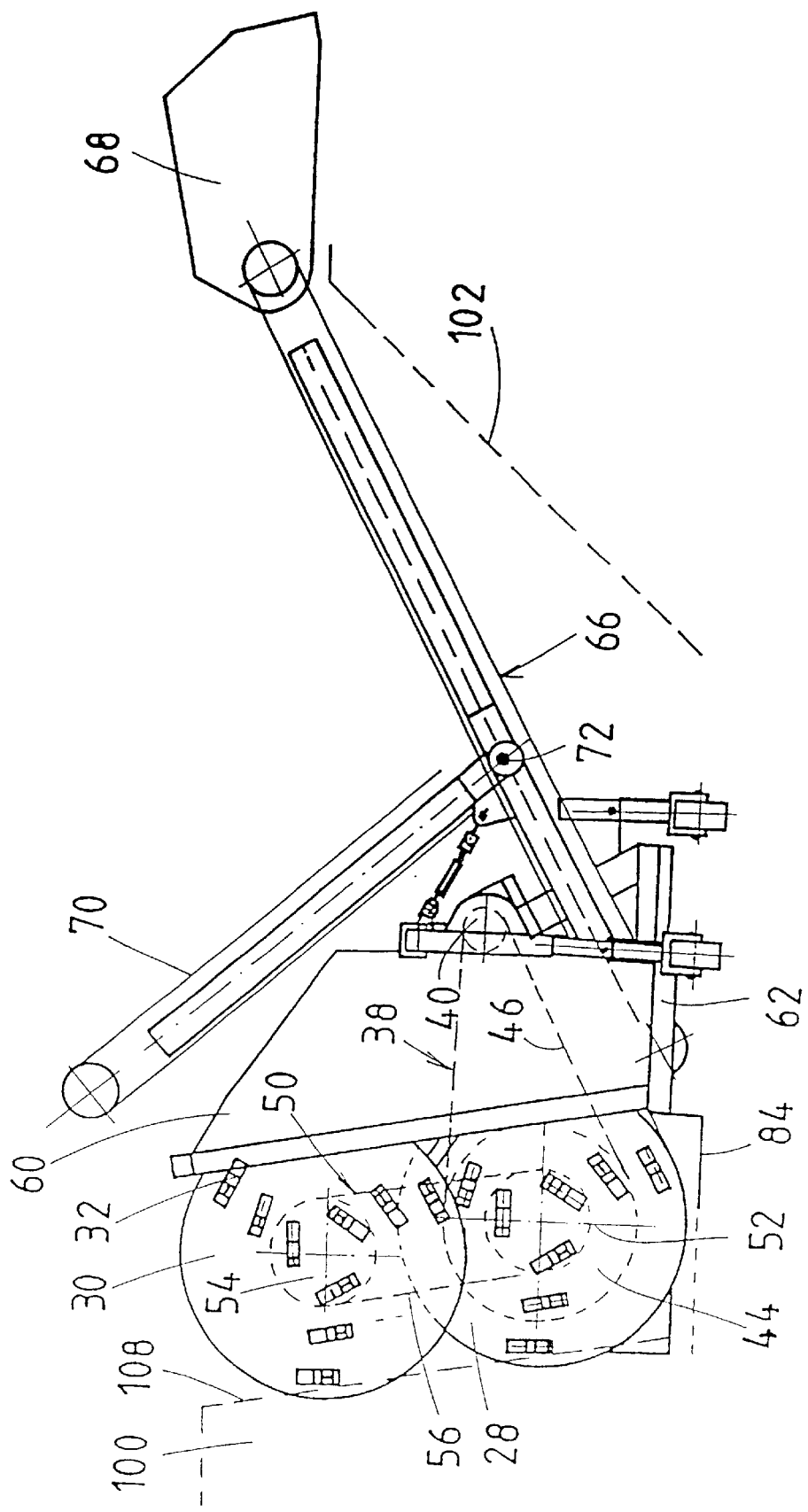
FIG. 2 is a front view of the machine as seen from the left in FIG. 1.
Figure 3:
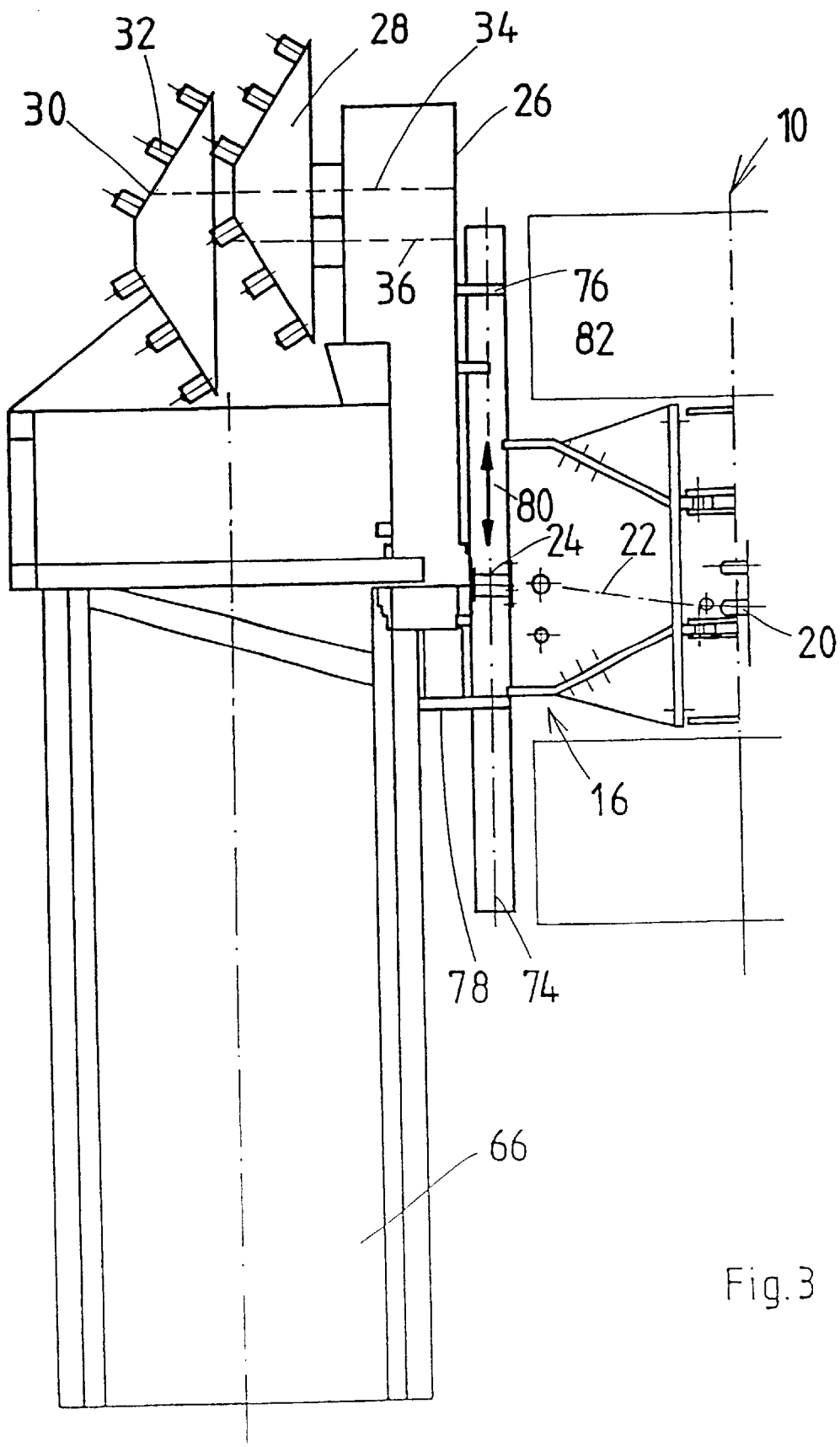
FIG. 3 is a fractional plan view of the machine and the carrier vehicle of FIG. 1.

As can be seen from FIGS. 2 and 3, the upper milling head 30 is located slightly in front of the lower milling head 28 in driving direction. As can be seen from FIGS. 2 and 3, the two milling heads 28 and 30 are arranged lateral of the carrier vehicle 10. The upper milling head 30 projects slightly more sidewards than the lower milling head 28.

A cap 60 extends on the inside partly over the milling heads 28 and 30. The cap 60 is located on a chassis 62. The chassis 62 also carries the transmission 26 with the milling heads 28 and 30. The chassis 62 is supported on supporting rollers 64 through springs 63. The chassis 62 is attached to the carrier vehicle 10 through the three-point suspension 16. The machine is supported hydraulically on the carrier vehicle 10, such that the main part of the machine weight is supported by the wheels of the carrier vehicle 10. The cap is open towards the bottom. A conveying belt 66 extends below the cap 60. The conveying belt 66 extends from the chassis 62 at an angle towards the top transversely to the driving direction and towards the side of the machine 14 remote from the milling heads. A baffle cap 68 open towards the bottom is attached to the outer end of the conveying belt 66.

An indicated in FIG. 2, a portion of the conveying belt 66 in pivotable upwards for transport about an axis 72.

A guiding member 74 is supported through the lower rods of the three-point suspension transversely to the driving direction. The machine is displaceably guided with a guide on the guiding member 74. Through a servomotor 80, the machine is displaceable on the guiding member 74 relative to the carrier vehicle 10 from an operating position with the milling heads 28 and 30 extending laterally (FIG. 3) into a retracted driving position, in which the milling heads 28 and 30 are located within a profile allowed for driving operation. The guiding member 74 is a tube, on which the machine is guided with projections 76 and 78 forming the guide and extending around the tube. A hydraulic control cylinder 80 is arranged in the tube and indicated by a double arrow 80 in FIG. 3. The control cylinder 80 extends over a driving pin 82 trough a longitudinal slot in the tube and engages the displaceable machine.

A shovel pan 84 for taking up dropped material is arranged below the milling heads 28 and 30 and guided over the ground. The shovel pan 84 extends with a outlet edge 86 (FIG. 4) over the conveying device 66, such that material being taken up is pushed onto the conveying device 66.

Figure 4:
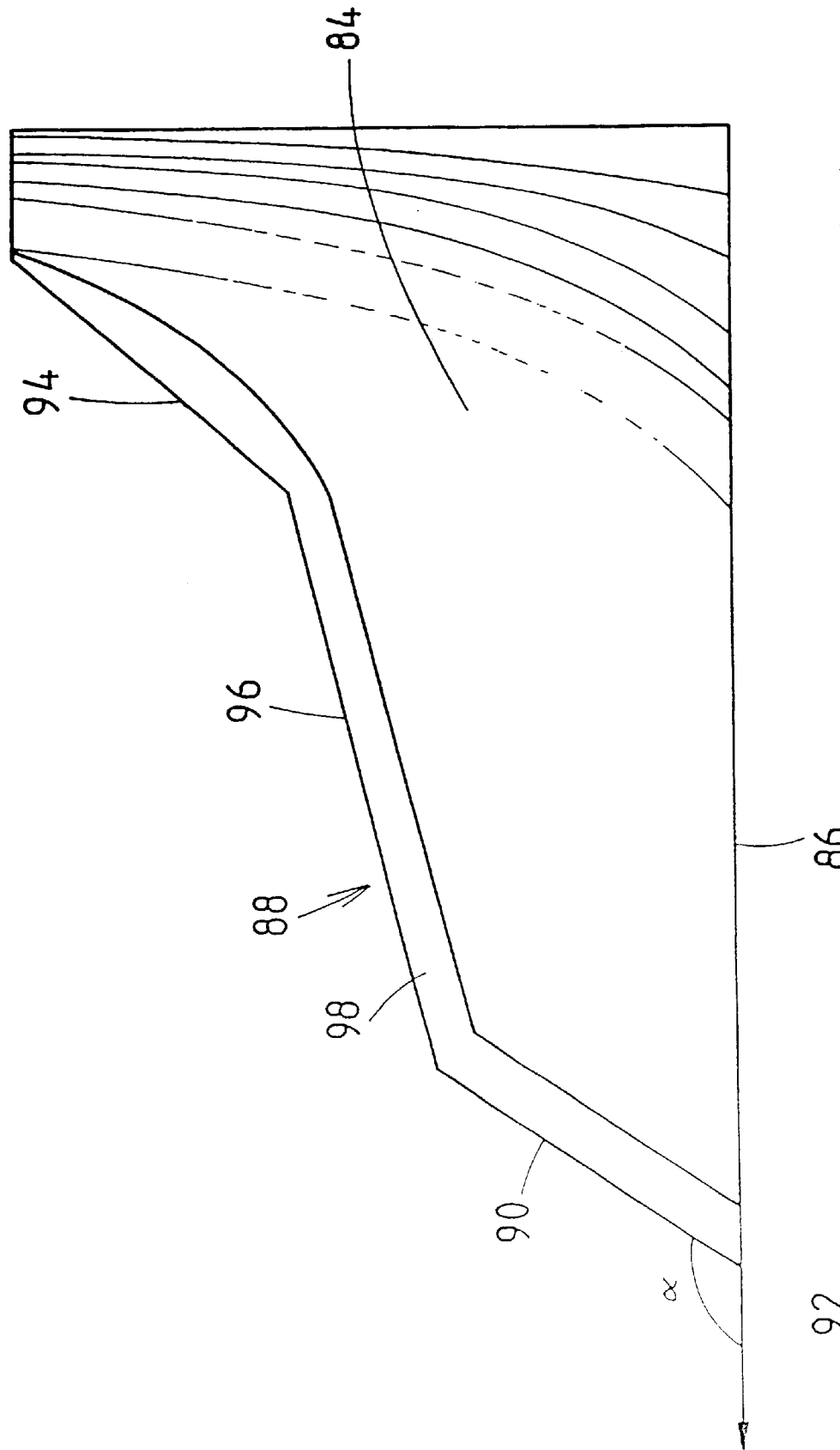
FIG. 4 shows schematically a shovel pan in a machine according to FIG. 1 to 3.
Figure 5:
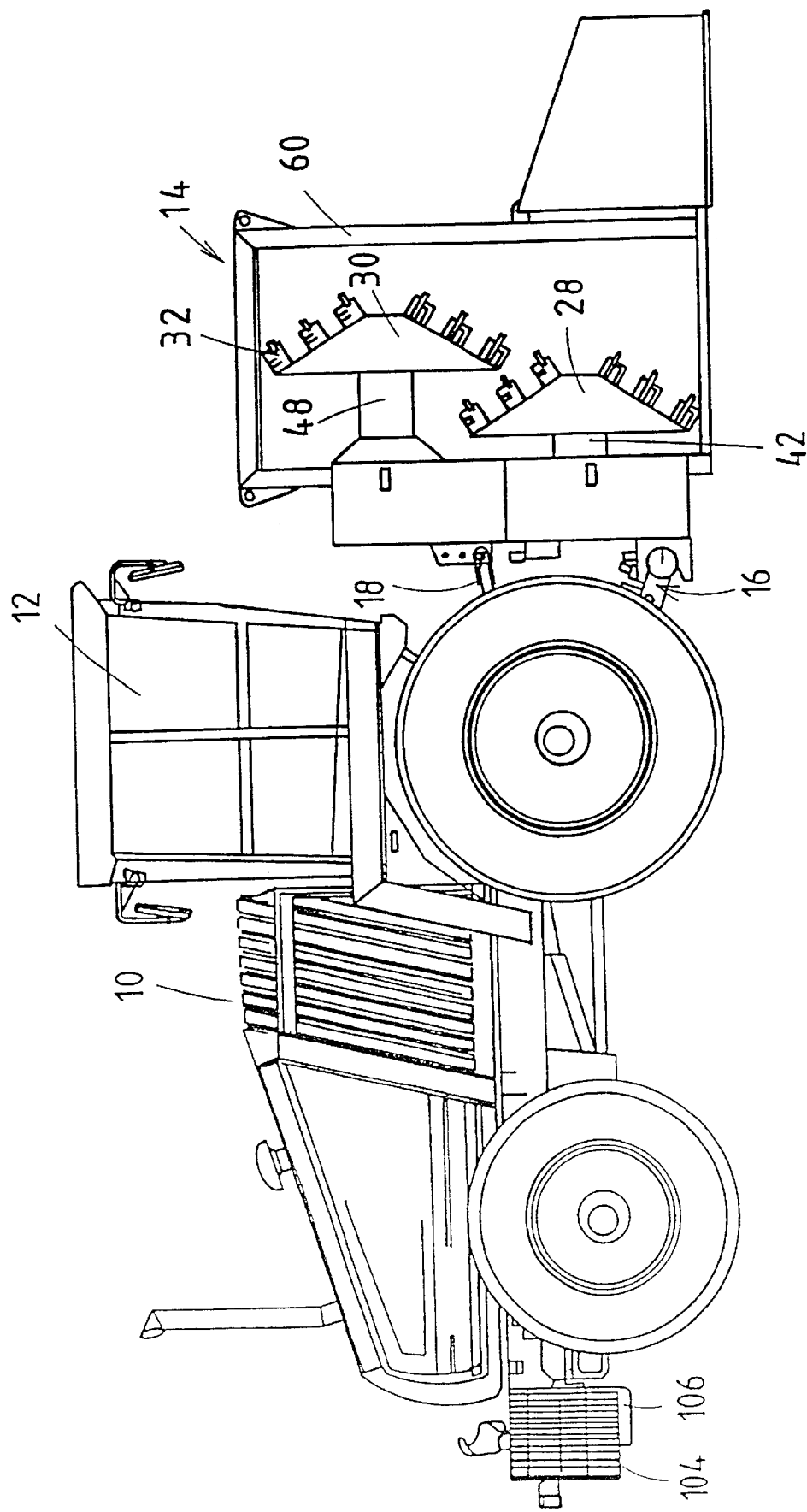
FIG. 5 shows, similar to FIG. 1, a side elevation of the machine with carrier vehicle, but in constructive illustration as seen from the left in FIG. 7.
Figure 6:
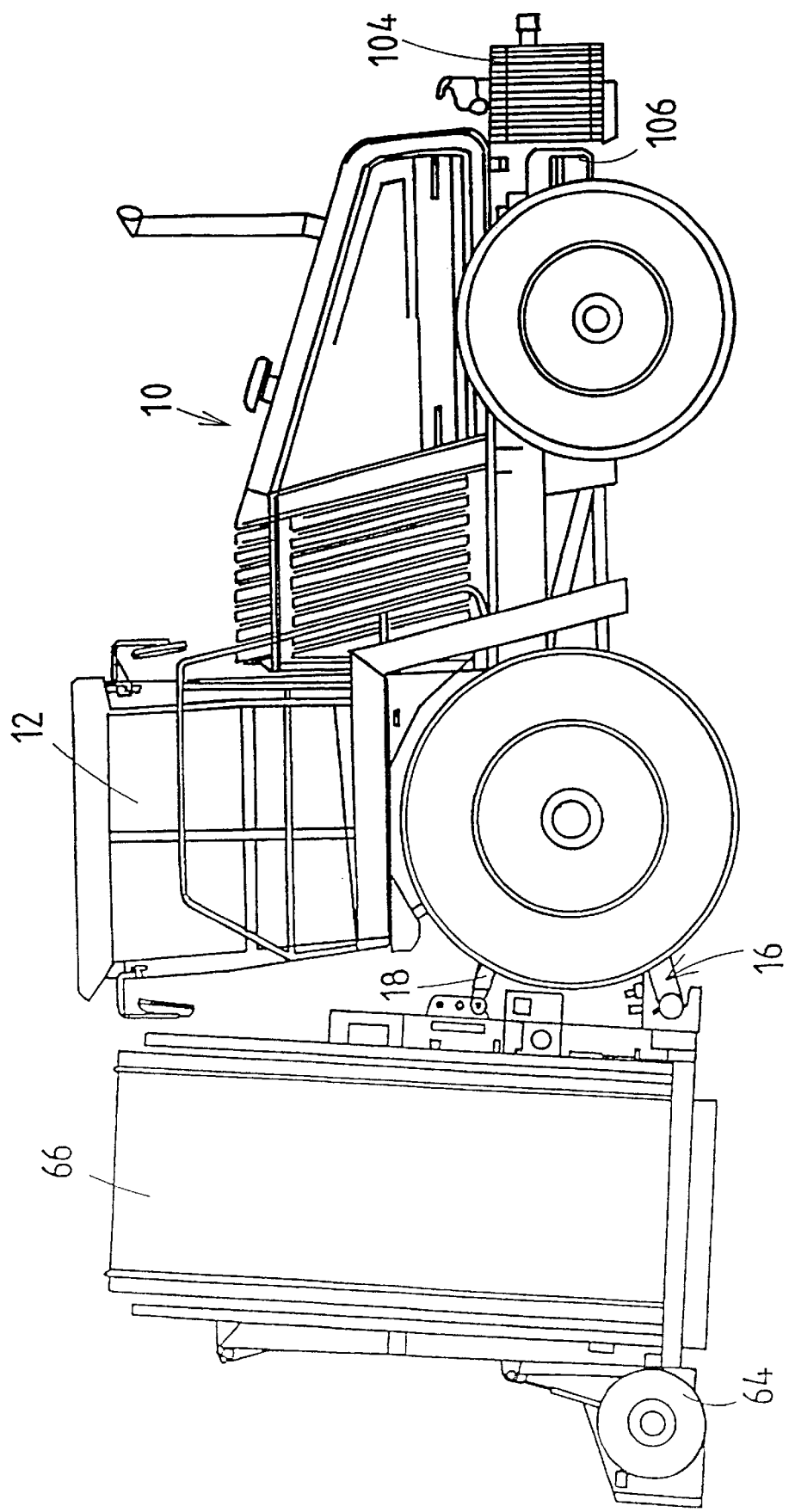
FIG. 6 shows, similar to FIG. 5, a side view of the machine and the carrier vehicle in driving operation action with the machine pulled up and the conveying belt tilted up, but as seen from the opposite side, that means from the right in FIG. 7.
Figure 7:
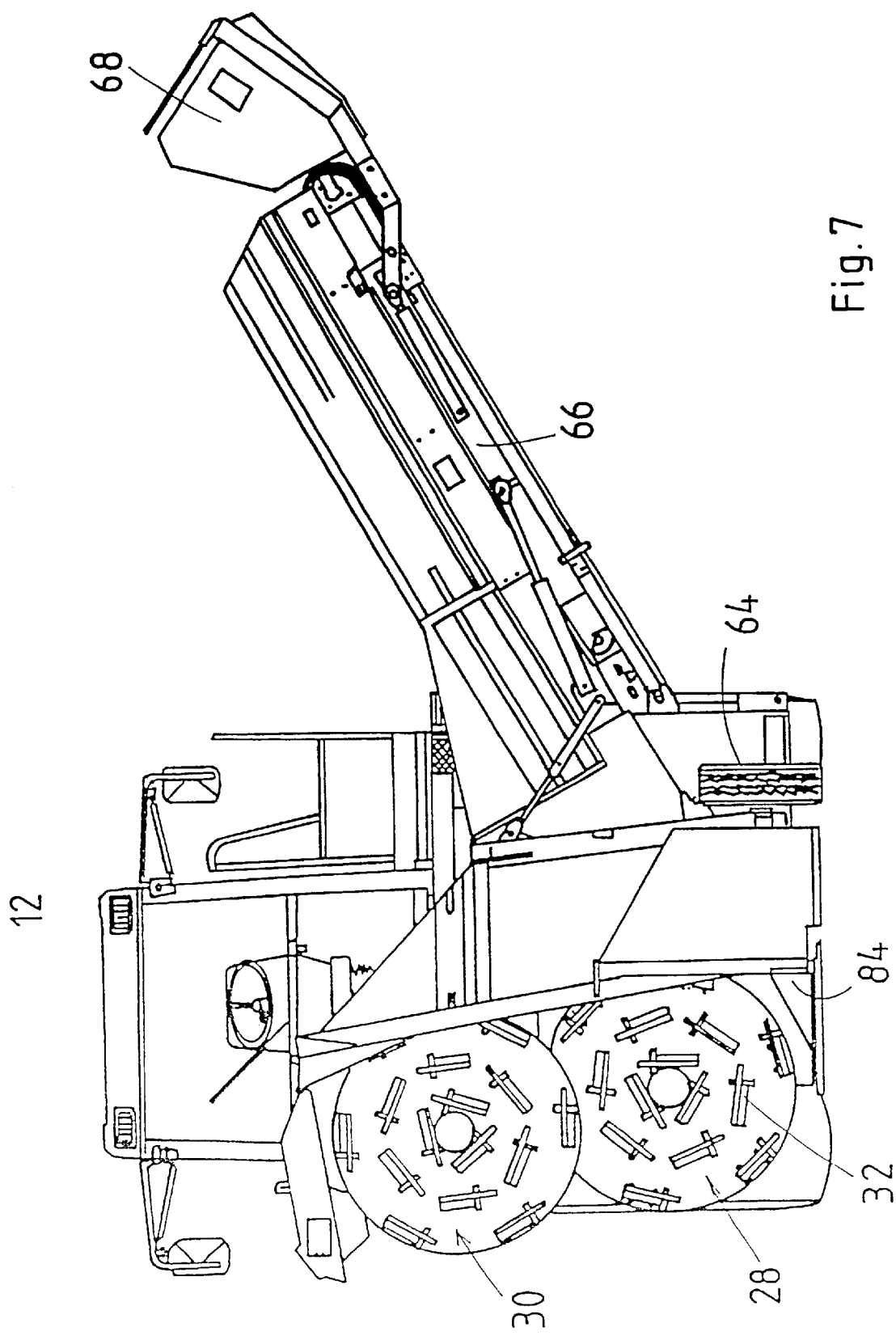
FIG. 7 shows a front view of the machine and the carrier vehicle.
Figure 8:
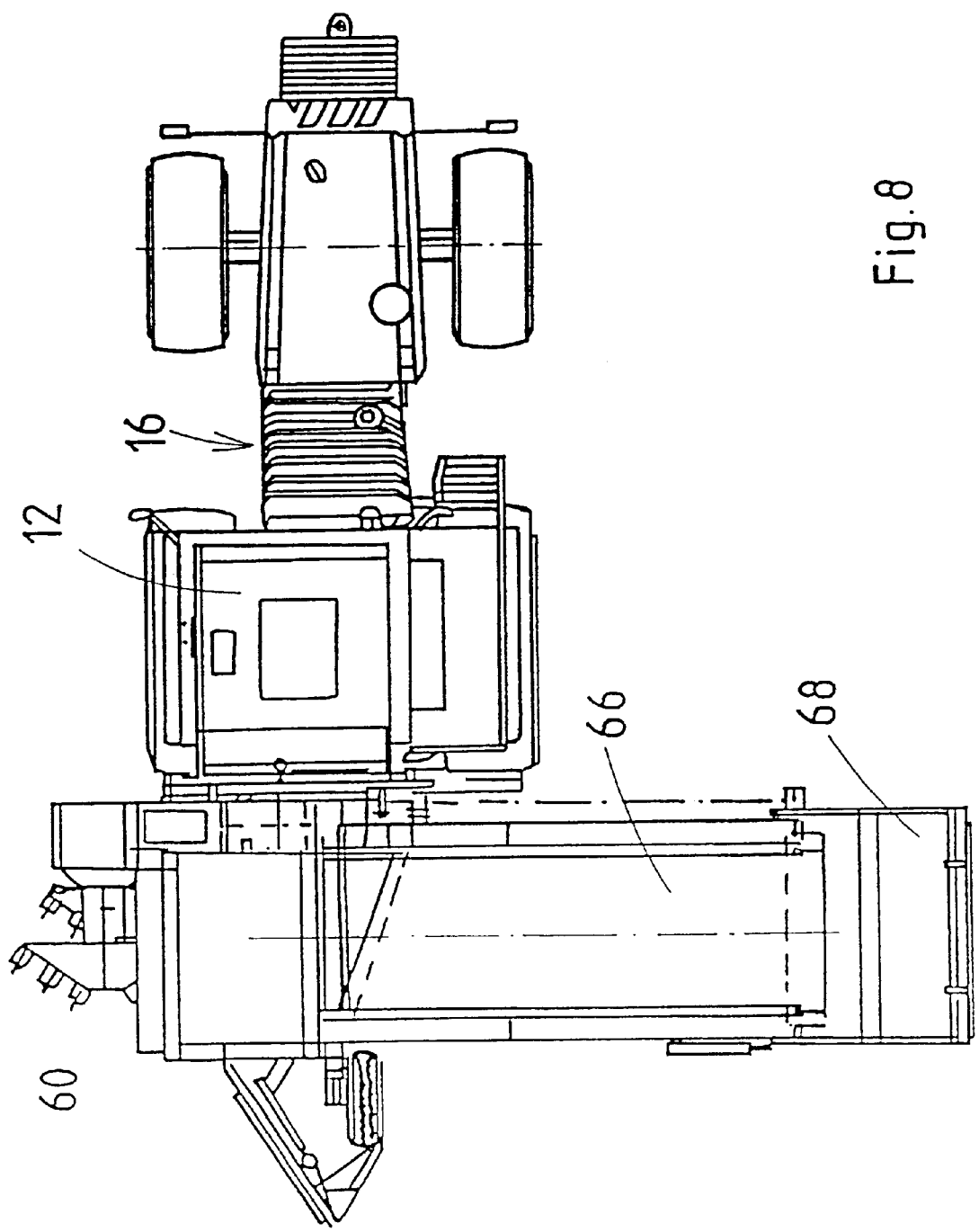
FIG. 8 shows a plan view of the machine and the carrier vehicle.

To this end, the front edge 88 of the shovel pan 84 has a first front section 90 located in the area of the upper milling head 30 and forming an obtuse angle α relative to the driving direction 92, a second rear section 94 located in the area of the lower milling head 28 and likewise forming an obtuse angle relative to the driving direction 92, and a third central section 96 interconnecting the first and the second sections 90 and 94. The shovel pan 84 has an outlet edge 86 (FIG. 4), which extends parallel to the driving direction 92 above the conveying device 66. As indicated in FIG. 4, the shovel pan 84 is curved such that is guides material being taken up to the outlet edge 86. The front edge 88 is scarfed in an area 98 (FIG. 4).

Figure 9:
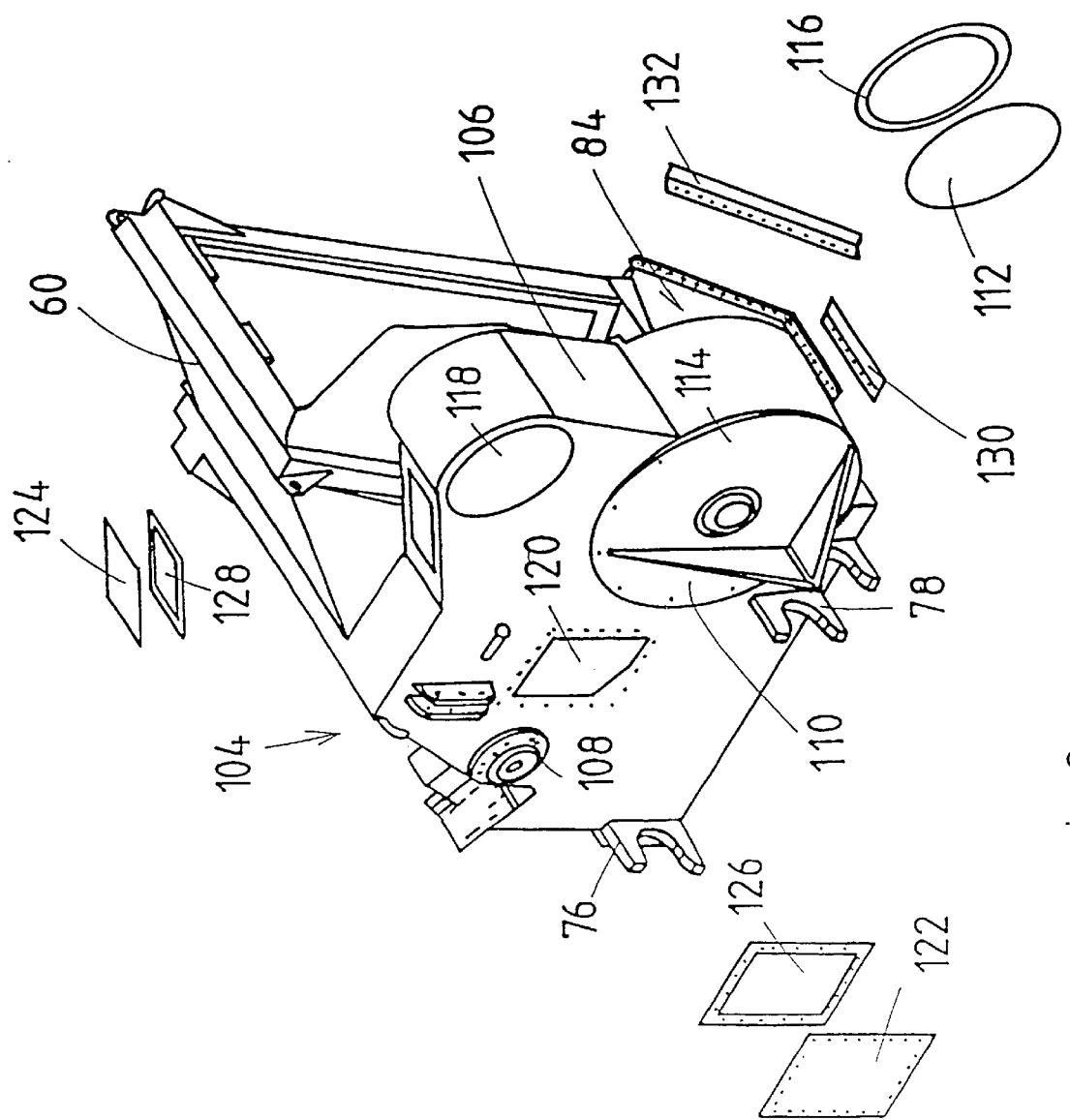
FIG. 9 is a partially exploded perspective illustration of the components of the housing of the machine of FIG. 1 to 8.

FIG. 9 shows the construction of the housing of the machine in a partially exploded perspective illustration.

The housing 104 comprises a transmission housing 106 and the cap 60. The chain wheel 40, the coaxial chain wheels 44 and 52 and the chain wheel 54 are mounted in the transmission housing 106. The chain wheels 44 and 52 and the chain wheel 54 are located on the shafts 42 and 48 of the milling heads 28 and 30, respectively. The chain wheel 40 is mounted in bearings in the transmission housing 106. The bearings of the shafts 42 and 48 are located in bearing plates 110 and 112, respectively. The bearing plates 110 and 112, respectively, closes openings as 118 in the bearing housing with seals therebetween. The transmission is accessible through maintenance openings as 120, which are closed by detachable plates 122 and 124, respectively, with seals 126 and 128, respectively, therebetween.

The projections 76 and 78 are attached to the transmission housing 104.

Ledges 130 and 132 scarfed at the front edge 88 arc screwed onto the shovel pan 84. The ledges are wearing parts and can easily be exchanged.

The described machine operates as follows:

The carrier vehicle 10 moves along a stack to be dislocated. During this movement, the milling heads 28 and 30 remove a wide strip from the stack 100, the width of which strip is in the order of magnitude of the radius of the milling heads 28 and 30. The material removed by milling is thrown by the milling heads 28 and 30 rotating with high rotary speed against the cap 60 and drops on the conveying belt 66. The conveying belt 66 transports the material transversely to the driving direction and deposits it in an area offset from the original stack 100, as indicated by the broken line 102 in FIG. 2. This mixes the material with air again. Furthermore, water can be supplied from a stationary port to a conduit 106 through a hose which is wound from a hose cylinder 104, through which conduit 106 the material on the conveying belt 66 is drizzled. This is not shown in the drawing.

Through the milling heads 28 and 30 the stack 100 is removed by milling up to a milling plane 108 which extends parallel to a plane extending through the axes of rotation of the milling heads 28 and 30. This plane is slightly inclined outwards due to the fact that upper milling head 30 projects outwards, that means towards the stack 100, relative to the lower milling head 28. Correspondingly, also the milling plane 108 is slightly inclined rearwards as seen from the right in FIG. 2. This prevents material from collapsing in the milling plane, as could be the case with a perpendicular milling plane. The same effect is achieved by the fact that upper milling head 30 projects in driving direction relative to the lower milling head 28. At first the material at the top is removed and thrown onto the conveying belt 66 and thereafter the material in the layers below.

The shovel pan 84 takes up material dropped down and guides this material through the outlet edge 86 and the conveying device 66 likewise to the new stack 102. This prevents the formation of a remaining ground layer of dropped material on the ground, which decomposes anaerobically and can lead to smell irritation. By the fact that the weight of the machine of about 40 kN mainly is supported on the wheels of the carrier vehicle and the supporting rollers take up the remaining weight of some few kN, it is ensured that the shovel pan 84 does not cut with its scarfed front edge into the ground, for example asphalt.

The machine can be moved relative to the carrier vehicle such that the milling heads 28 and 30 are located within the side profiles permissible for driving operation on the road. After the conveying device 66 has been pivoted inwards and the driver's cab has been rotated, the carrier vehicle 10 can be driven on the road with the machine being supported on it.

The repulsion forces acting on the milling heads 28 and 30 in operation act against the driving direction. Thus, these repulsion forces cannot push the machine and the carrier vehicle 10 away from the stack. A relatively wide strip is removed from the stack at each passage. This results in a high throughput. The described milling heads 28 and 30 do not comminute plastic foils present in the material into small pieces, which are so small that they cannot be separated during the subsequent sieving process. The machine allows to remove the material by milling from the front end of a wide stack. No wide intermediate areas have to be left free between longitudinal roof-shaped stacks for the passage of the machine and the carrier vehicle. This ensures a better exploitation of the available ground surface.

I claim:

1. A machine for adapted to be moved in a moving direction and dislocating stacks by removing material through milling from a stack, comprising
    a milling cutter, which is laterally guided along said stack in said moving direction and comprising means for removing a layer of material from said stack up to a milling plane;
    a conveyor means for receiving said material removed by said milling and for depositing deposit said material in an area offset from said milled stack;
    wherein said milling cutter comprises two rotating milling heads, each of which having a rotation axis extending substantially in said moving direction or forming an acute angle relative to said moving direction.

2. The machine of claim 1, wherein said milling heads are disc- or plate-shaped.

3. The machine of claim 2, wherein each one of said milling heads forms a plate vaulted in said moving direction and having a front side, milling bodies being provided at said front side.

4. The machine of claim 2, wherein said milling heads are truncated cone-shaped.

5. The machine of claim 1, wherein said milling heads are arranged one above the other defining an upper and a lower milling head.

6. The machine of claim 5, wherein a plane extending through said rotation axes of said milling heads is inclined towards said stack by an angle which prevents said stack from collapsing in said milling plane.

7. The machine of claim 5, wherein said upper milling head is offset in said moving direction relative to said lower milling head.

8. The machine of claim 7, wherein said shovel pan has a front edge which is stepped corresponding to the longitudinal offset of said milling heads.

9. The machine of claim 8, wherein said front edge of said shovel pan is scarfed.

10. The machine of claim 9, wherein said front edge of said shovel pan has
    a first front section in the area of said upper milling head, said first front section forming an obtuse angle relative to said moving direction,
    a second rear section in the area of said lower milling head, said second rear section likewise forming an obtuse angle relative to said moving direction, and
    a third central section interconnecting said first and said second sections.

11. The machine of claim 10, wherein
    said shovel pan has an outlet edge, which extends parallel to said moving direction above said conveying device, and
    said shovel pan is curved such that it guides material being taken up to said outlet edge.

12. The machine of claim 1, further comprising a cap covering said the milling heads on a portion remote from said stack and guiding said material removed by milling to said conveying device.

13. The machine of claim comprising meanf for rotating both said milling heads rotate same direction.

14. The machine of claim 13, wherein said milling heads rotate with a rotary speed of more than 100 rpm.

15. The machine of claim 1 further comprising means for supplying water to said material transported on said conveying device.

16. The machine of claim 1, wherein said machine is constructed as a unit without driving means, said unit being supported on a carrier vehicle and being arranged to be driven by a power take-off shaft of said carrier vehicle.

17. The machine of claim 16, further comprising
    a guiding member supported on said carrier vehicle transversely to said moving direction;
    a guide adapted to displaceably guide said machine on said guiding member; and
    a servomotor arranged to displace said machine on said guiding member relative to said carrier vehicle from an operating position with said milling heads extending laterally into a retracted driving position, in which said milling heads are located within a profile allowed for driving operation.

18. The machine of claim 17, wherein
    the guiding member is a tube, on which said machine is guided with projections (76, 78) extending around said tube;
    a hydraulic control cylinder (80) is arranged in said tube; and said control cylinder engages said displaceable machine through a longitudinal slot in said tube.

19. The machine of claim 18, comprising means for rotating said conveying device inwards for transport.

20. The machine of claim 1, further comprising a shovel pan for taking up dropped material, said shovel pan being arranged below said milling heads and guided over the ground.

21. The machine of claim 20, wherein said shovel pan has an outlet edge extending over said conveying device, such that material being taken up is pushed onto said conveying device.

22. The machine claim 20, wherein said machine is hydraulically supported on said carrier vehicle, such that a main part of said machine weight is supported by wheels of the carrier vehicle.

23. The machine of claim 22, further comprising supporting rollers running on the ground, through which the remaining weight of said machine is supported.

24. The machine of claim 25, further comprising springs, through which said machine is supported on said supporting rollers.

* * * * *

UNITED STATES PATENT AND TRADEMARK OFFICE
CERTIFICATE OF CORRECTION

PATENT NO. : 6,364,029 B1
DATED : April 2, 2002
INVENTOR(S) : Werner Doppstadt

It is certified that error appears in the above-identified patent and that said Letters Patent is hereby corrected as shown below:

<u>Title page,</u>
Item [22], please change the PCT filing date to correctly read:
-- PCT Filed: Feb. 4, 1998 --

Signed and Sealed this

Third Day of September, 2002

Attest:

Attesting Officer

JAMES E. ROGAN
*Director of the United States Patent and Trademark Office*